Dec. 11, 1962  A. DALMASSO  3,068,314
SUSPENSION FOR AN ELECTRIC CABLE
Original Filed Sept. 22, 1958
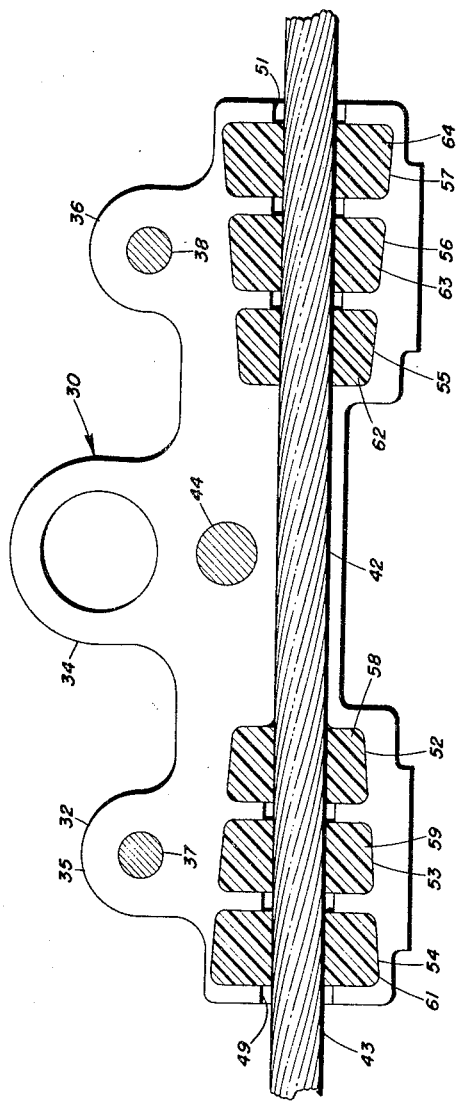
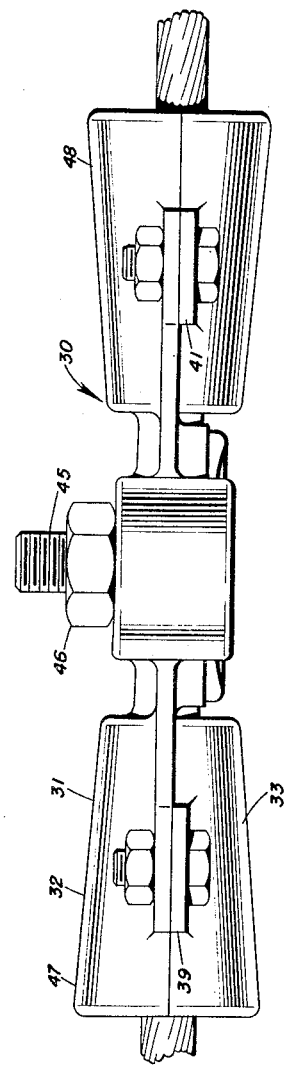
AUGUSTE DALMASSO
INVENTOR.
BY
*Norman S. Blodgett*
ATTORNEY

United States Patent Office 3,068,314
Patented Dec. 11, 1962

3,068,314
SUSPENSION FOR AN ELECTRIC CABLE
Auguste Dalmasso, Paris, France, assignor to L'Aluminium Francais, Paris, France, a society of France
Original application Sept. 22, 1958, Ser. No. 762,332. Divided and this application Mar. 23, 1961, Ser. No. 97,861
2 Claims. (Cl. 174—42)

This invention relates to a suspension for an electric cable and more particularly to a supporting means for electric power lines capable of reducing destructive vibrations in the cable. This is a division of my patent application Serial Number 762,332, filed September 22, 1958, now Patent No. 2,984,441.

It is well known that overhead power lines or cables are subject to a catenary sagging between suspension points and that this sagging is associated with oscillations of the line. In the course of time metal fatigue takes place in the area of the suspensions due to these oscillations and this fatigue can result in the eventual breakage of the line. Heretofore, the devices which have been proposed have only partially diminished the problem of fatigue of overhead lines due to vibration. For instance, the use of a rubber sleeve inserted between the cable and the jaws of a clamp-type suspension device reduces the fatigue of the cable only by a small amount, but does not prevent the danger of breakage due to vibration. At the same time, a rapid deterioration of the rubber because of its compression against the cable serves to impair the ability of the suspension to fix the cable in place. These and other deficiencies in the prior art devices have been obviated in a novel manner by the present invention.

It is, therefore, an outstanding object of the present invention to provide a suspension for an electric cable which is capable of substantially reducing vibration and, therefore, fatigue in the cable.

Another object of this invention is the provision of a cable suspension which will reduce and suppress fatigue in overhead lines.

A still further object of the instant invention is the provision of a suspension for an electric cable which substantially reduces vibrations therein but which, at the same time, serves to immobilize the cable at its suspension point.

Another object of the invention is a cable suspension having vibration damping means, which means does not carry the weight of the cable and, therefore, is not subjected to deterioration because of excessive loading.

It is a still further object of this invention to provide a vibration-damping cable suspension which is inexpensive to manufacture and which is capable of a long life of useful service.

To the accomplishment of the foregoing and related ends, invention, then, comprises the features hereinafter fully described and particularly pointed out in the claims, the following description and the annexed drawings setting forth in detail certain illustrative embodiments of the invention, these being indicative, however, of but two of the various ways in which the principle of the invention may be employed.

In the annexed drawings:

FIG. 1 is a vertical sectional view of a cable suspension embodying the principles of the present invention; and FIG. 2 is a plan view of the suspension shown in FIG. 1.

Referring first to FIGS. 1 and 2, wherein are best shown the general features of the invention, the cable suspension, indicated generally by the reference numeral 30, comprises a main body 31 which is divided into two halves 32 and 33, the main body portion 32 being provided with a suspension ring 34. The main body portion 32 is also provided with ears 35 and 36 provided, respectively, with apertures 37 and 38 located at the ends thereof. The main body portion 33 is also provided with ears 39 and 41 provided with apertures which match, respectively, with the apertures 37 and 38 of the ears 35 and 36. Suitable nuts and bolts are provided to pass through the ears and clamp the two halves of the main body 31 together. The main body portion 32 is provided with a semi-cylindrical central passage 42 adapted to fit tightly around an electric cable 43. The main body portion 33 is provided with a similar semi-cylindrical passage (not shown) which matches exactly with the passage 42 to form a circular cylindrical passage tightly embracing the cable and clamping it in place. To facilitate this clamping the central portion of the main body portion 32 is provided with an aperture 44 through which normally extends a stud 45 extending from the main body portion 33, there being a nut 46 extending over the stud and locking the two body portions in clamping relationship about the cable 43. The ends of the main body 31 are formed with frustro-conical end portions 47 and 48 through which pass bores 49 and 51, these bores being considerably larger than the bores defined by the passage 42 in the central portion thereof. Formed in the sides of the bore 39 are frustro-conical grooves 52, 53, and 54, the conical bottoms of these grooves lying on an imaginary frustro-conical surface having its larger end outward from the center of the main body in a manner similar to the outward form of the end 47 of the main body. In the same way the bore 51 is provided with similar frustro-conical grooves 55, 56 and 57. In each of the grooves 52, 53, 54, 55, 56 and 57 is situated a vibration damper 58, 59, 61, 62, 63, and 64, respectively. These vibration dampers are formed of a resilient material, such as an elastomer or a plastic. Such polymeric materials may be used as butadiene-styrene, butadiene-acrylonitrile, chlorobutadiene, dimethylbutadiene, isobutylene, isoprene, and so on, known under the commercial designations of buna, neoprene, G–R–S, G–R–M, G–L–A, and so on.

The operation of this present embodiment of the invention will be quite clear from the above description. The cable 43 is clamped in the middle portion of the main body 32 and the vibrations are repressed by the various vibration dampers. Because the fact that the volume of each vibration damper is in proportion to the distance from the clamping point, it can be seen that the vibration damping is approximately a straight-line function in the preferred embodiment. It will be understood that this probably only approximates the degree of damping necessary, but in a practical case may be sufficient to reduce the vibration of the wire to a level below a dangerous condition.

It should be noted that one of the important features of the invention lies in the fact that the vibration dampeners are provided with a means for preventing creeping of the vibration damping material. It will be understood that most vibration damping material, because of its very nature, is somewhat subjected to creeping. That is to say, there is a tendency to remain in a condition of displacement under force rather than return to the original condition once the force has been removed. In the case of the invention shown herein, the creeping is prevented by enclosing each of the elements of the vibration damping means in a groove which encloses it and prevents it from moving longitudinally of the cable. At least part of the vibration damper is on the cable under considerable pressure, which pressure is sufficient to create a permanent tension or stress in the resilient material but is less than the pressure which would cause the elastic limit of the material to be reached.

Other modes of applying the principles of the invention may be used, change being made as regards the details described, provided the features stated in the following claims or the equivalent of such be employed.

The invention having been thus described, what is claimed as new and desired to secure by Letters Patent is:

1. A suspension for an electric cable, comprising an elongated main body adapted to extend along the cable, clamping means located in the central portion of the main body for fixing the cable against movement relative to the body and for carrying the weight of the cable, a vibration damping means located at the ends of the main body and supported thereby, the said vibration damping means producing a resistance to lateral movement of the cable, the amount of said resistance being in inverse proportion to the distance from the clamping means, and means associated with the vibration damping means to prevent creeping thereof along the cable, wherein the means to prevent creeping consists of annular grooves formed in the main body and in which the vibration damping means is mounted.

2. A suspension for an electric cable, comprising a main body adapted to extend along the cable, means for suspending the main body centrally thereof, clamping means located in the central portion of the main body and making direct contact with the cable for fixing the cable against movement relative to the body and for carrying the weight of the cable, a series of vibration dampers located at the ends of the main body and supported thereby, the said vibration-damping dampers being formed of vibration-absorbing material and having thicknesses transversely of the cable which from damper to damper increase as a function of the distance from the said clamping means, and annular grooves formed in the main body and in which the vibration dampers are mounted.

References Cited in the file of this patent
FOREIGN PATENTS

| | | |
|---|---|---|
| 719,015 | Germany | Mar. 28, 1942 |
| 542,670 | Italy | Apr. 30, 1956 |